(12) United States Patent
Aboubacar Alka et al.

(10) Patent No.: US 12,141,284 B2
(45) Date of Patent: Nov. 12, 2024

(54) METHOD FOR DETECTING ANOMALIES IN AN INFORMATION SYSTEM, COMPUTER PROGRAM AND SYSTEM FOR DETECTING ANOMALIES IMPLEMENTING SUCH A METHOD

(71) Applicant: BULL SAS, Les Clayes-sous-bois (FR)

(72) Inventors: Mahamadou Salissou Aboubacar Alka, Mantes-la-Jolie (FR); Béranger Guedou, Mantes-la-Jolie (FR)

(73) Assignee: BULL SAS, Les Clayes-sous-Bois (FR)

( * ) Notice: Subject to any disclaimer, the term of this patent is extended or adjusted under 35 U.S.C. 154(b) by 366 days.

(21) Appl. No.: 17/710,935

(22) Filed: Mar. 31, 2022

(65) Prior Publication Data

US 2022/0318388 A1    Oct. 6, 2022

(30) Foreign Application Priority Data

Apr. 1, 2021    (EP) ..................... 21305423

(51) Int. Cl.
  *G06N 3/08*     (2023.01)
  *G06F 21/56*    (2013.01)
  *G06N 3/045*    (2023.01)

(52) U.S. Cl.
  CPC .......... *G06F 21/566* (2013.01); *G06N 3/045* (2023.01); *G06N 3/08* (2013.01); *G06F 2221/034* (2013.01)

(58) Field of Classification Search
  CPC . G06F 21/566; G06F 2221/034; G06N 3/045; G06N 3/08; H04L 63/1425
  See application file for complete search history.

(56) References Cited

U.S. PATENT DOCUMENTS

2005/0125710 A1    6/2005    Sanghvi

OTHER PUBLICATIONS

European Search Report issued in EP21305423.2, dated Sep. 2, 2021 (9 pages).
Jmila, et al., "Siamese Network Based Feature Learning for Improved Intrusion Detection", Dec. 9, 2019, Advances in Intelligent Data Analysis XIX, Springer International Publishing, pp. 377-389.

*Primary Examiner* — Aftab N. Khan
(74) *Attorney, Agent, or Firm* — ARC IP Law, PC; Joseph J. Mayo (57) ABSTRACT

A method, system and computer program, implemented by a computer, for detecting anomalies in an information system (IS) including a detection phase for an entity of the IS and at a time window, called a current unitary window. The detection phase includes generating a digital signature, called a unitary signature, representative of a behavior of the entity during the current unitary window based on data relative to the entity and collected during the current unitary window. The detection phase also includes calculating an anomaly score, associated with the entity for the current unitary window, based on the unitary signature and a digital signature, called a reference. The reference is previously calculated for the entity and is representative of the activity of the entity over a period preceding the current unitary window. Each digital signature is generated using a generator based on previously trained deep learning Siamese neural networks.

14 Claims, 3 Drawing Sheets

METHOD FOR DETECTING ANOMALIES IN AN INFORMATION SYSTEM, COMPUTER PROGRAM AND SYSTEM FOR DETECTING ANOMALIES IMPLEMENTING SUCH A METHOD

This application claims priority to European Patent Application Number 21305423.2, filed 1 Apr. 2021, the specification of which is hereby incorporated herein by reference.

BACKGROUND OF THE INVENTION

Field of the Invention

The invention relates to a method for detecting anomalies in an information system comprising several computer entities. It also relates to a computer program, a system for detecting anomalies and an information system implementing such a method.

The field of the invention is the field of cybersecurity, and in particular of detecting anomalies, such as attempted attacks, in an information system ("IS").

Description of the Related Art

Cybersecurity already has various tools based on predefined rules making it possible to detect attacks or attempted attacks targeting an IS, based on predefined detection rules.

However, some threats are not detected by existing tools because they do not trigger the conditions of the rules of the existing tools. For example, it may involve the "Advanced Persistent Threat" type, which produces weak signals over a long time, or of the "Black Swan" type, which are unknown and unforeseeable attacks.

One or more embodiments of the invention is to remedy the above-mentioned shortcoming.

One or more embodiments of the invention propose a solution for more effectively detecting attacks or threats, and more generally anomaly(ies) in an information system.

At least one embodiment of the invention is to propose a solution for more effectively detecting attacks or threats, and more generally anomaly(ies) within an information system, that is adaptive and which adapts, especially in an autonomous way, to changes in said information system.

BRIEF SUMMARY OF THE INVENTION

The invention makes it possible to achieve at least one of these purposes by a method, implemented by computer, for detecting anomalies in an information system, IS, comprising several computer entities, said method comprising at least one iteration of a detection phase for at least one entity of said IS and for at least one current time window, called current unitary window, said detection phase comprising the following steps:
  collecting data related to an activity of said entity during said current unitary window;
  constructing a data set, called observation, associated with said current unitary window, based on data collected during a window (W), called observation, comprising said current unitary window,
  generating a digital signature, called unitary signature, representative of a behavior of said entity during said current unitary window based on said observation; and
  calculating an anomaly score, associated with said entity for said current unitary window, based on:
    said unitary signature, and
    a digital signature, called reference, previously calculated for said entity and representative of the activity of said entity over a period (P), called reference, in particular sliding, preceding said current unitary window (J);
characterized in that each digital signature is generated using a generator based on previously trained deep learning Siamese neural networks.

Thus, the solution proposed by one or more embodiments invention makes it possible to generate, for each entity and for each unitary window, a unitary digital signal representative of the behavior of said entity during said unitary window. This unitary signature is compared to a reference signature representative of the average behavior of this entity over a reference period, prior to, and in particular immediately prior to, said unitary window. It is then possible to detect a deviation in the behavior of the entity during the unitary window, by calculating an anomaly score between the unitary signature and the reference signature.

Moreover, the reference period is a period, preferably sliding, that precedes the unitary window in time, and in particular immediately preceding, in such a way that the solution proposed by one or more embodiments of the invention is adaptive and adaptable to slow or progressive changes in the behavior of the computer entity.

Furthermore, in a particularly advantageous way, at least one embodiment of the invention proposes using deep learning Siamese neural networks for generating signatures, both for the unitary signature as well as for the reference signature. The use of Siamese neural networks enables greater precision and robustness of detection of anomalies with a learning that is not as long, less cumbersome and using fewer observations for the learning. The use of Siamese neural networks also makes it possible to obtain a signature generator that is little affected or unaffected by the addition or removal of a computer entity within the IS, which avoids having to repeat the training phase with each addition, removal or modification of a computer entity within the IS.

Furthermore, the method according to one or more embodiments of the invention makes it possible to carry out an anomaly detection which is not limited to a predetermined anomaly list, in other words without having to specify upstream the anomaly or anomalies to be detected. This enables a broader panel of anomalies to be detected. In addition, this makes it possible to carry out an adaptive detection which is adapted to the appearance of new anomalies. For example, the method according to one or more embodiments of the invention makes it possible to detect anomalies that would be unknown at the time the neural networks are trained.

In short, the solution proposed by the one or more embodiments of the invention enables a detection of anomalies to be carried out within an IS that is more efficient, more adaptive, while being simpler and faster to implement.

The unitary window, denoted J, may have a duration of one hour, one day, or one week.

The observation window, denoted W, may be equal to the unitary window. Preferentially, the observation window may comprise several unitary windows. More particularly, the observation window may comprise several unitary windows. For example, the unitary window may be one day, and the observation window may correspond to 7 days. In every case, the observation window comprises and is terminated by the current unitary window.

The reference period, denoted P, is the period considered for defining an average behavior of the entity. This reference period preferably comprises a multitude of unitary windows. Preferentially, it comprises a multitude of observation windows. In every case, preferably the reference period is sliding and is terminated by the unitary window immediately preceding the current window.

According to at least one embodiment, the unitary window, denoted J, may be a day, the observation window, W, may be several days, for example 10 days, and the reference period, P, may for example be 90 days. In this case, the observation window W comprises 10 unitary windows, the reference period P comprises 90 unitary windows and 81 observation windows. For example, in considering an activity period of 100 days, the current unitary window $J_{100}$ is the $100^{th}$ day. The 9 unitary windows $J_{99}$-$J_{90}$ immediately preceding the current unitary window $J_{100}$ form, with the current unitary window $J_{100}$, the observation window for generating the current unitary signature. The reference period P then comprises the 90 unitary windows $J_{99}$-$J_{10}$ immediately preceding the current unitary window $J_{100}$, and does not comprise the current unitary window $J_{100}$. The reference period P comprises 81 observation windows: $W_{81}=J_{99}$-$J_{90}$, $W_{80}=J_{98}$-$J_{89}$, $W_{79}=J_{97}$-$J_{88}$, ..., $W_{1}=J_{19}$-$J_{10}$. Of course, this is a non-limiting exemplary embodiment provided only by way of illustration.

The behavior of a computer entity of an IS may be described by all the application logs generated by its activity in the information system.

At least one application log may constituted by the entity itself, or a machine, virtual or physical on which said computer entity is found.

At least one application log of a computer entity may be constituted by another entity of the IS, such as for example a server or a gateway, etc.

At least one application log may be kept up to date by an application tool natively present on a machine corresponding to said computer entity, or on which said computer entity is found.

At least one application log may be kept up to date by an application tool deployed and dedicated to that function on a machine corresponding to said computer entity or on which said computer entity is found.

According to one or more embodiments, at least one application log may be a log from the Windows Active Directory (AD), or a log from a proxy located in the IS, or a data or application server.

At least one computer entity may be a physical machine such as a server, for example. In this case, the data related to the activity of this computer entity may be collected by virtue of activity logs kept by said server.

At least one computer entity may be a virtual machine executed on a physical machine. In this case, the data related to the activity of this computer entity may be collected by virtue of activity logs kept by said virtual machine or said physical machine.

At least one computer entity may be a user account tied to an actual user. In this case, the data related to the activity of this computer entity may be collected by virtue of the Windows AD logs if it involves a Windows environment, or log of the same type in another environment.

At least one computer entity may be a functional account, such as an "administrator" account for example, that may be used by several actual users. In this case, the data related to the activity of this computer entity may be collected by virtue of the Windows AD logs if it involves a Windows environment.

As indicated above, the reference period may preferably comprise several unitary windows preceding the current unitary window.

In this case, the method according to one or more embodiments of the invention may comprise a step of generating the reference signature comprising the following steps:
- for each unitary window of the reference period, generating, by the signature generator, a unitary digital signal based on the observation associated with said unitary window, and
- calculating said reference signature based on said generated unitary signatures, particularly by averaging said unitary signatures.

Thus, the reference signature clearly represents the average behavior of the digital entity for the reference period, which makes it possible to take into account the changes in the time and intermittent changes in the behavior of the computer entity.

The detection phase may further comprise an updating of the reference signature with the unitary signature associated with the current unitary window, for a new iteration of said detection phase for a subsequent unitary window.

Thus, for the subsequent unitary window, the reference signature takes into account the behavior of the entity during the current window, which makes it possible to monitor the behavior of the computer entity with no discontinuity.

According to at least one embodiment for a unitary signature, denoted $S_0$, the anomaly score, denoted $Z_0$, may be calculated using the following relationship:

$$Z_0=(d_0-\text{MEAN})/\text{STD}$$

where
- $d_0$ is the distance between the reference signature, denoted $R_0$, and the current unitary signature $S_0$. This distance may be the cosine distance, or any other distance indicating the difference between the signature $S_0$ and the reference distance $R_0$;
- MEAN is the average of the distances between the reference signature $R_0$ and each unitary signature associated with each unitary window of said reference period $P_0$; and
- STD is the standard deviation of the distances between the reference signature $R_0$ and each unitary signature associated with each unitary window of said reference period $P_0$.

Of course, other relationships are possible, but the proposed relationship enables greater detection efficiency.

According to at least one embodiment, the observation window may be equal to the unitary window.

In this case, the observation associated with the current unitary window is constructed based on data collected only during the unitary window. This embodiment has the advantage of giving a representation of the ad hoc behavior of the computer entity and enables more detailed monitoring of this behavior. It makes it possible to detect brief, ad hoc changes in the behavior of the computer entity.

In particular, the observation may correspond to a vector of several parameters comprising for each parameter at least one value measured for this parameter during the unitary window for the computer entity. For example, if the data collection step carries out a data collection concerning 200 parameters, then the observation may be a vector of dimension 200.

Alternatively, the observation window may be a sliding time window comprising the current unitary window and at least one previous unitary window, particularly immediately preceding in time, said current unitary window.

In this case, the observation associated with the current unitary window is constructed based on data collected during said unitary windows. In other words, the unitary signature associated with the current unitary window is generated based on data collected during said unitary windows.

At least one embodiment has the advantage of giving a representation of the current behavior of the computer entity during the current unitary window in combination with the behavior thereof over at least one unitary window, which makes it possible to moderate the one-off modifications that may occur during the current unitary window.

In particular, the observation may correspond to a matrix formed by as many vectors as there are unitary windows in the observation window. For example, in a case where:
- the observation window comprises seven unitary windows, and
- the data collection step carries out a data collection involving 200 parameters;

then the observation may be a matrix of seven vectors, each of dimension 200.

The data collection step may comprise a collection of one or more values for one or more predefined parameters.

It is important that each parameter for which data are collected has a job-related meaning so that the digital signature that will then be generated based on the value of that parameter is useful for discriminating the behaviors of this entity and detecting a deviant or abnormal behavior relative to an average behavior over the reference period.

The person skilled in the art is able to determine which parameters have a job-related meaning and should be monitored.

According to one or more embodiments, the data collection step may collect data for at least one of the following parameters:
- number of logins performed by the computer entity during the unitary window;
- number of frequent/infrequent processes executed by the computer entity during the unitary window. A process is considered to be frequent when it forms part of the X, for example 5, processes most executed during the reference period. A process is considered to be infrequent when it forms part of the Y, for example 3, processes least executed during the unitary window;
- number of accesses to frequent/infrequent hosts, performed by the entity during the unitary window. A host is considered frequent, respectively infrequent, when it forms part of the X, for example 4, hosts most often accessed, respectively the Y, for example 2, hosts least often accessed, during the reference period;
- names of processes executed, transformed by means of vectorization methods, such as for example tf-idf;
- paths to files executed, transformed by means of vectorization methods, such as for example tf-idf;
- etc.

For example, the values of one or more of these parameters are available in the Windows AD logs.

Advantageously, the method according to one or more embodiments of the invention may comprise a step of aggregating, for at least one parameter, several values collected during the unitary window.

Such an aggregation may comprise an averaging of several values collected for this parameter during the unitary window.

According to at least one embodiment, such an aggregation may comprise a concatenation of several values collected for this parameter during the unitary window.

Alternatively or in addition, such aggregation may comprise determining a value based on collected data, such as for example frequency of occurrence of a value, a standard deviation, etc.

For example, the parameter may comprise the frequency of access of an entity to an application server. In this case, the access logs comprise the names of the devices that the entity has accessed. These values are then processed to determine the frequency of occurrence of the identifier or of the address of said application server.

This aggregation step may be carried out progressively during the collection step as the data are collected, or at the end of the data collection step.

The method according to one or more embodiments of the invention may comprise, prior to the detection phase, a learning phase of the Siamese neural networks with a base of observations, called learning base.

The purpose of the learning is to obtain a Siamese network furnishing different signatures for two observations related to two entities, and signatures that are identical or very similar for observations relative to the same entity.

The learning base comprises observations of the same nature, and comprising the same parameters, as the observations used during the detection phase. In other words, when, during the detection phase the observation consists of a vector of dimension N, for example a vector of dimension 200, then the learning phase also comprises observations consisting of vectors of dimension N, and in particular 200.

The learning base may comprise observations concerning several, even all, of the entities of the IS.

For example, if there are observations concerning the entities of the IS during a period of 1 year, the observations obtained over 9 months may be used for the learning and the observations obtained during the other three months may be used as basis of validation for ensuring that the learning is satisfactory.

According to at least one embodiment, the Siamese neural networks may be trained using a Contrastive Loss optimization function.

In this case, the training furnishes as input two Siamese neural networks:
- a pair of observations, denoted "$O_i$" and "$O_j$", one observation for each of the neural networks, and
- a binary label, denoted "Y", which indicates if the two observations belong to the same computer entity.

The Siamese networks each produce a signature, denoted $S_i$ for the observation $O_i$ and $S_j$ for the observation $O_j$. The objective of the training by Contrastive Loss is to minimize the standardized distance, denoted $d(S_i,S_j)$, for example the cosine distance, between the two signatures $S_i$ and $S_j$ if they belong to the same entity, and to maximize it otherwise.

It is estimated that the learning is satisfactory if:
- the distance $d(S_i,S_j) \geq 0.7$, when $S_i$ and $S_j$ belong to different computer entities.
- the distance $d(S_i,S_j) < 0.3$ when $S_i$ and $S_j$ belong to the same entity.

In this case, the learning phase may be stopped.

Otherwise, the learning phase must continue.

According to one or more embodiments, it is possible to train several models, for example each one during a fixed number of iterations, particularly 100 iterations, and to choose the model that furnishes the best results.

According to at least one embodiment, the Siamese neural networks may be trained using a Triplet Loss optimization function.

In this case the training furnishes as input three Siamese neural networks sharing exactly the same weights/parameters, a triplet of observations, denoted "$O_i$," and "$O_j$," and "$O_k$,", one observation for each of the three neural networks, $O_i$ and $O_j$ belonging to the same computer entity and $O_k$ to another computer entity.

The Siamese networks each produce a signature, denoted $S_i$ for the observation $O_i$ and $S_j$ for the observation $O_j$ and $S_k$ for the observation $O_k$. The objective of training by Triplet Loss is to ensure that the distance, for example the cosine distance, between the two signatures of the same entity $d(S_i, S_j)$ is less than the distance between the two signatures belonging to two different entities $d(S_i, S_k)$.

It is estimated that the learning is satisfactory if:

$$d(S_i,S_k)/d(S_i,S_k)\geq 2$$

In this case, the learning phase may be stopped. Otherwise, the learning must continue.

According to one or more embodiments, it is possible to train several models, for example each one during a fixed number of iterations, particularly 100 iterations, and to choose the model that furnishes the best results.

Of course, although described with reference to one entity, one or more embodiments of the invention is preferably applied to several, and in particular to all the computer entities of an IS.

According to another aspect of one or more embodiments of the invention, proposed is a computer program comprising instructions executable by a computing device which, when they are executed, implement the method according to one or more embodiments of the invention.

The computer program may be encoded in any computer language.

The computer program may comprise only one computer program or a set of computer programs cooperating with each other.

According to another aspect of at least one embodiment of the invention, proposed is a computer medium on which the computer program according to the invention is stored in a non-transitory or non-volatile manner.

The computer medium may be a USB key, a CD-ROM, a flash memory, an electronic or computer device such as a tablet, a computer, a server, etc.

According to one or more embodiments of the invention, proposed is a system for detecting anomalies in an information system, IS, comprising means configured for implementing the method according to the invention.

The system according to at least one embodiment of the invention may comprise one or more computer devices.

In particular, the system may be a server, connected to each of the computer entities of the information system and comprising:
  a module for collecting and aggregating data during the unitary window,
  a generator of unitary digital signatures comprising a previously trained Siamese neural network,
  a module for calculating a reference signature; and
  at least one module for calculating an anomaly score.

Each of these modules may be a software module or a hardware module or a combination of at least one software module and at least one hardware module such as a processor, an electronic chip, etc.

At least one of these modules may be an individual module.

At least two of these modules may be integrated within a single module, software and/or hardware.

According to at least one embodiment the invention, proposed is an information system comprising:
  several computer entities, and
  means configured for implementing the method according to one or more embodiments of the invention, such as for example a computer program according to the invention or a system according to the invention.

As explained above, at least one computer entity may be a physical machine, or a virtual machine, a physical user account, a functional user account, etc.

BRIEF DESCRIPTION OF THE DRAWINGS

Other benefits and features shall become evident upon examining the detailed description of an entirely non-limiting embodiment, and from the enclosed drawings in which.

DETAILED DESCRIPTION OF THE INVENTION

It is understood that the one or more embodiments disclosed hereunder are by no means limiting. In particular, it is possible to imagine variants of the invention that comprise only a selection of the features disclosed hereinafter in isolation from the other features disclosed, if this selection of features is sufficient to confer a technical benefit or to differentiate the invention with respect to the prior state of the art. This selection comprises at least one preferably functional feature which lacks structural details, or only has a portion of the structural details if that portion is only sufficient to confer a technical benefit or to differentiate the invention with respect to the prior state of the art.

In the figures the same reference has been used for the features that are common to several FIGURES.

Figure 1:
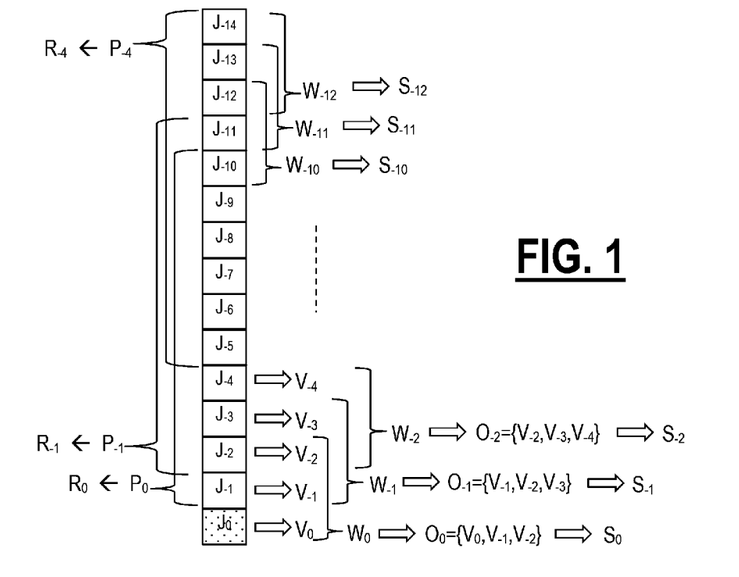
FIG. 1 is a schematic representation of a non-limiting example of time windows that may be used in one or more embodiments of the invention.

FIG. 1 is a schematic representation of a non-limiting exemplary embodiment of time windows that may be used in one or more embodiments of the invention.

FIG. 1 schematically shows several, and in particular, fifteen unitary time windows denoted $J_0$-$J_{-14}$. Each of these time windows corresponds to the time period during which values of a plurality of predefined parameters are collected for at least two computer entities. The values of the parameters collected during a window $J_i$ represent the behavior of the computer entity during the unitary window $J_i$. In the example shown, the time window $J_0$ is considered to be the current unitary window, the time window $J_{-1}$ the window immediately preceding the current time window, and so on.

The unitary window may correspond to a period of one day, several days, a week, etc.

FIG. 1 also shows a plurality, particularly thirteen, of observation windows denoted $W_0$ to $W_{-12}$. Each observation window $W_i$ corresponds to the time period considered for obtaining one observation enabling a digital signature associated with a computer entity and a unitary window to be generated. Each observation window $W_i$ is associated with a unitary window $J_i$ and comprises said unitary window $J_i$. The observation window $W_0$ corresponds to the current observation window and is associated with the current unitary window $J_0$, the observation window $W_{-1}$ is the one immediately preceding the current observation window $W_0$ in time, and so on. In the example shown, and in a non-limiting manner, each observation window $W_i$ associated with a unitary window $J_i$ comprises said unitary window $J_i$ and two other windows $J_{i-1}$ and $J_{i-2}$, immediately preceding said unitary window $J_i$ in time. For example, the current observation window $W_0$ comprises the current unitary window $J_0$ and the unitary windows $J_{-1}$ and $J_{-2}$ immediately preceding it in time, the current observation window $W_{-1}$ comprises the unitary window $J_{-1}$ and the unitary windows $J_{-2}$ and $J_{-3}$ immediately preceding it in time. Thus, each observation window $W_i$ is a time window sliding backwards and comprising the unitary window $J_i$ with which it is associated.

Of course, the example given in FIG. 1 is in no way limiting and the observation window may comprise a different number of unitary windows than the one indicated in this example. In particular, the observation window $W_i$ may comprise only the unitary window $J_i$ with which it is associated.

FIG. 1 also shows a plurality, in particular five, reference periods denoted $P_0$ to $P_{-4}$. Each reference period $P_i$ corresponds to the time period concerned in generating a digital signature, called reference signature, associated with a computer entity, and representative of a reference behavior of said computer entity to which reference is made for determining whether or not a behavior of said computer entity is abnormal over a unitary window. Each reference period $P_i$ is associated with a unitary window $J_i$ but does not comprise said unitary window $J_i$.

In the shown example, each reference period $P_i$ associated with a unitary window $J_i$ comprises the 10 unitary windows $J_{i-1}$ to $J_{i-10}$ immediately preceding said unitary window $J_i$ in time. Thus, the current reference period $P_0$ associated with a current unitary window $J_0$ comprises the 10 unitary windows $J_{-1}$ to $j_{-10}$ immediately preceding it. The reference period $P_{-1}$ associated with a unitary window $J_{-1}$ comprises the 10 unitary windows $J_{-2}$ to $J_{-11}$ immediately preceding it, and so on.

Of course, the example provided in FIG. 1 is in no way limiting. The reference period may comprise a number M of unitary windows that is different from the one indicated in this example. Preferentially, the reference period is sliding in time. However, the reference period may not be sliding and may be fixed. Moreover, the duration of the reference period may be fixed or variable.

According to the one or more embodiments of the invention, a unitary signature $S_i$ is generated for each unitary window $J_i$, taking into account the data collected during the observation window $W_i$ associated with said unitary window $J_i$. Thus, in the example shown in FIG. 1, for the current unitary window $J_0$, a unitary signature $S_0$ is generated by a signature generator taking into account the data collected during the current observation window $W_0$, in other words during the unitary windows $J_0$, $J_{-1}$ and $J_{-2}$. For the unitary window $J_{-1}$, a unitary signature $S_{-1}$ is generated by a signature generator taking into account the data collected during the current observation window $W_{-1}$, in other words during the unitary windows $J_{-1}$, $J_{-2}$ and $J_{-3}$, and so on.

According to one or more embodiments of the invention, a reference signature $R_i$ is generated for each unitary window $J_i$. In the shown example, and in no way limited thereto, the reference signature $R_0$ is calculated as being the average of all the unitary signatures generated for all the unitary windows located within the reference period. Thus, for the current reference period $P_0$, the reference signature $R_0$ is calculated as being the average of all the unitary signatures $S_{-1}$ to $S_{-10}$. For the current reference period $P_{-1}$, the reference signature $R_{-1}$ is calculated as being the average of all the unitary signatures $S_{-2}$ to $S_{-11}$, and so on.

Of course, the reference signature may be calculated in a way other than the one described here with reference to FIG. 1. For example, the reference signature may be calculated by extrapolation of the unitary signatures associated with the unitary windows composing it, or by using any other predefined relationship.

According to one or more embodiments of the invention, the behavior of a computer entity during a unitary window $J_i$ is deemed as being normal or not based on an anomaly score, denoted $Z_i$, calculated according to the reference signature $R_i$ and the unitary signature $S_i$ associated with said unitary window $J_i$. Thus, for the current unitary window $J_0$, the behavior of the entity is deemed abnormal or not based on the anomaly score $Z_0$ calculated based on the unitary signature $S_0$ and the reference signature $R_0$.

According to a at least one embodiment, the anomaly score of a computer entity associated with the unitary window $J_i$ is calculated with the following relationship:

$$Z_i = (d_i - \text{MEAN}_i)/\text{STD}_i$$

where
- $d_i$ is the distance, and in particular the cosine distance, between the reference signature $R_i$ and the unitary signature $S_i$;
- $\text{MEAN}_i$ is the average of the distances between the reference signature $R_i$ and each unitary signature associated with each unitary window of the reference period $P_i$, and
- $\text{STD}_i$ is the standard deviation of the distances between the reference signature $R_i$ and each unitary signature associated with each unitary window of the reference period $P_i$.

Of course, the example provided for calculating the anomaly score is in no way limiting. For example, the anomaly score may alternatively be calculated as being the cosine distance between the unitary signature $S_i$ and the reference signature $R_i$. The anomaly score may be calculated using any other predetermined relationship.

Then, this calculated anomaly score $Z_i$ may be compared to at least one predetermined threshold value, denoted T, indicating an abnormal behavior.

The threshold value T may be determined by tests and may be fixed.

Alternatively, the threshold value may be variable and may be recalculated for each unitary window $J_i$. For example, the threshold value T may be the maximum value of the cosine distances between the unitary signatures associated with the unitary windows composing the reference period. Any other relationship may be used.

According to at least one embodiment of the invention, for a computer entity a unitary signature $S_i$ associated with a unitary window $J_i$ is calculated based on an observation $O_i$ associated with said unitary window $J_i$, said observation $O_i$ comprising at least the data collected and aggregated during the observation window $W_i$ associated with said unitary window $J_i$.

In particular, for each unitary window $J_i$, data relative to N predetermined parameters, denoted $F_1$-$F_N$, are collected, with N≥1. These data are aggregated, for example by averaging or by concatenation or by any other known method, in order to obtain a matrix of dimension N, indicating the value obtained for each parameter during said unitary window. When the observation window only comprises the unitary window, then the observation consists in said vector of dimension N. When the observation window comprises M unitary windows, with M≥2, for example as shown in FIG. 1, then the observation consists of a matrix formed by M vectors of dimension N, namely the M vectors of dimension N obtained for the M unitary windows composing the observation window $W_i$.

Thus for the example of FIG. 1, the observation $O_0$ associated with the unitary window $J_0$ for a computer entity consists of a matrix formed by three vectors of dimensions N, namely the vectors $V_0$, $V_{-1}$ and $V_{-2}$ collected for the unitary windows $J_0$, $J_{-1}$ and $J_{-2}$, in such a way that $O_0=\{V_0, V_{-1}, V_{-2}\}$. The observation $O_{-1}$ associated with the unitary window $J_{-1}$ consists of a matrix formed by three vectors of dimensions N, namely the vectors $V_{-1}$, $V_{-2}$ and $V_{-3}$ collected for the unitary windows $J_{-1}$, $J_{-2}$ and $J_{-3}$, in such a way that $O_{-1}=\{V_{-1},V_{-2},V_{-3}\}$, and so on.

For example, if 200 parameters are monitored, then each vector $V_i$ has a dimension 200 and each matrix $O_i$ is a matrix comprising 3 lines and 200 columns.

Any parameter related to the operation of a computer entity may be monitored, such as for example a number of logins performed by the computer entity, a number of frequent/infrequent processes executed by the computer entity, a number of accesses by the computer entity to frequent/infrequent hosts, the names of processes executed by the computer entity, the paths to files executed by the computer entity, etc. The values of certain parameters may be used directly. For other parameters the measured values may first be transformed before being stored in the vector.

According to one or more embodiments of the invention, a unitary signature $S_i$ associated with a unitary window $J_i$ is generated by a signature generator denoted GEN, also called generator, taking the observation $O_i$ as input, associated with said unitary window $J_i$.

According to one or more embodiments of the invention, the generator is based on Siamese neural networks architecture previously trained by deep learning.

Thus, the at least one embodiment of the invention enables a detection of anomalies within an IS that is more efficient, more adaptive, while being simpler and faster to implement.

Figure 2A:
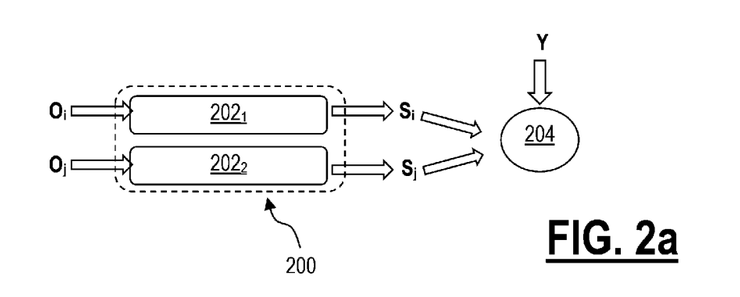
FIG. 2a is a schematic representation of a non-limiting example of Contrastive Loss training that may be used in one or more embodiments of the invention.
Figure 2B:
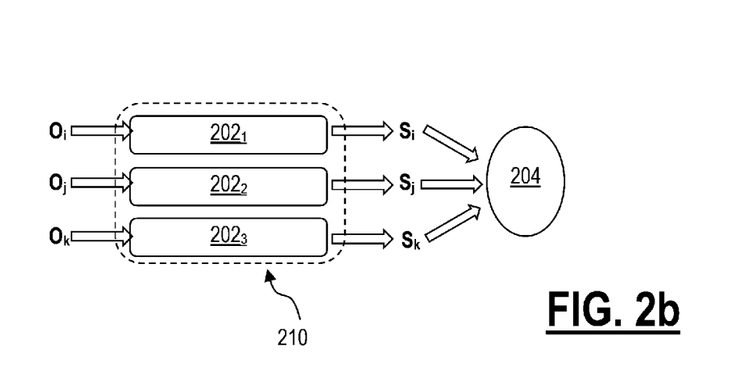
FIG. 2b is a schematic representation of a non-limiting example of Triplet Loss training that may be used in one or more embodiments of the invention.

We will now describe, with reference to FIGS. 2a and 2b, non-limiting examples of deep training of neural networks that may be implemented in one or more embodiments of the invention.

The training of Siamese neural networks is achieved with a base of observations, called training base, comprising a large number of observations related to several, even all, of the computer entities of an IS. For example, the training base may comprise observations obtained over a period of a year. The observations obtained over a period of 9 months may be used to train the Siamese neural networks and the observations obtained over the remaining three months may be used to validate the performance of the trained Siamese neural networks.

FIG. 2a is a schematic representation of an example of training of Siamese networks that may be used in one or more embodiments of the invention.

The training shown schematically in FIG. 2a is known by the name of Contrastive Loss.

FIG. 2a shows a signature generator 200 comprising two Siamese networks $202_1$ and $202_2$ of identical architectures.

The two Siamese networks $202_1$ and $202_2$ share exactly the same parameters. The updates of the parameters are synchronized between the two Siamese networks $202_1$ and $202_2$, that is when the parameters of one network are updated, those of the other are also updated in the same way. In this way at each instant t, the values of the parameters are exactly the same between the networks. Thus, once the model is trained, just one of the networks may be maintained in order to generate signatures Each of the Siamese networks $202_1$ and $202_2$ is intended for taking an observation as input and to furnish a digital signature for this observation as output. During the learning phase a comparator 204 takes as input the signatures furnished by each of the Siamese networks 202 on the one hand, and data "Y" indicating whether the two signatures correspond to the same entity or to different entities. The comparator is configured to determine the distance between the signatures furnished by the Siamese networks $202_1$ and $202_2$, and to compare this distance to at least one predetermined value indicating an identity or not of the two signatures.

According to the shown example, the training furnishes:
a pair of observations, namely an observation $O_i$ for the neural network $202_1$ and an observation $O_j$ for the neural network $202_2$; and
a binary label, denoted "Y" with Y=1 if the two observations $O_i$ and $O_j$ belong to the same computer entity, and Y=0 otherwise.

The neural network $202_1$ produces a signature $S_i$ for the observation $O_i$ and the neural network $202_2$ produces a signature $S_j$ for the observation $O_j$. The comparator 204 determines the standardized distance denoted $d(S_i,S_j)$, for example the cosine distance, between the two signatures $S_i$ and $S_j$. This distance $d(S_i,S_j)$ should be minimized if the two signatures belong to the same entity, and maximized otherwise.

It is estimated that the learning of the generator 200 comprising the Siamese neural networks is satisfactory if:
the standardized distance $d(S_i,S_j)≥0.7$, when $S_i$ and $S_j$ belong to different computer entities.
the standardized distance $d(S_i,S_j)≤0.3$ when $S_i$ and $S_j$ belong to the same entity.
In this case, the learning phase may be stopped. Otherwise, the learning must continue.

Once the generator is trained, either of the Siamese networks $202_1$ and $202_2$ may be used to generate the unitary signatures. The other Siamese network is not used.

According to one alternative, it is possible to train several models, for example each one during a fixed number of iterations, particularly 100 iterations, and to choose the model that furnishes the best results for the signature generator.

FIG. 2b is a schematic representation of a non-limiting exemplary embodiment of training of Siamese networks that may be used in one or more embodiments of the invention.

The training shown schematically in FIG. 2b is known by the name of Triplet Loss.

FIG. 2b shows a signature generator 210 comprising three Siamese networks $202_1$, $202_2$ and $202_3$ of identical architecture, each intended to take an observation as input and to furnish a digital signal for this observation as output. During the learning phase, a comparator 204 taking as input the signatures furnished by each of the Siamese networks 202 and configured to compare these signatures to each other, for example by calculating the distance between these signatures taken two by two.

According to the shown example, the training furnishes:
- an observation, denoted "$O_i$" as input of the neural network $202_1$,
- an observation, denoted "$O_j$" as input of the neural network $202_2$, and
- an observation, denoted "$O_k$" as input of the neural network $202_3$.

The observations $O_i$ and $O_j$ concern the same entity and the observation $O_k$ concerns another entity.

The neural network $202_1$ produces a signature $S_i$ for the observation $O_i$, the neural network $202_2$ produces a signature $S_j$ for the observation $O_j$, and the neural network $202_3$ produces a signature $S_k$ for the observation $O_k$. The comparator 204 determines the standardized distance, denoted $d_1(S_i,S_j)$, for example the cosine distance, between the two signatures $S_i$ and $S_j$. It also determines the standardized distance, denoted $d_2(S_i,S_k)$ between the two signatures $S_i$ and $S_K$. The purpose of the Triplet Loss training is to minimize the distance $d_1$ and maximize the distance $d_2$.

According to an exemplary embodiment in no way limiting, the learning may be considered as satisfactory if:

$$d_2(S_i,S_k)/d_1(S_i,S_j) \geq 2$$

Otherwise, the learning must continue.

Once the generator is trained, any of the Siamese networks $202_1$, $202_2$ or $202_3$ may be used to generate the unitary signatures. The other Siamese networks are not used.

According to one alternative, it is possible to train several models, for example each one during a fixed number of iterations, particularly 100 iterations, and to choose the model that furnishes the best results for the signature generator.

Figure 3:
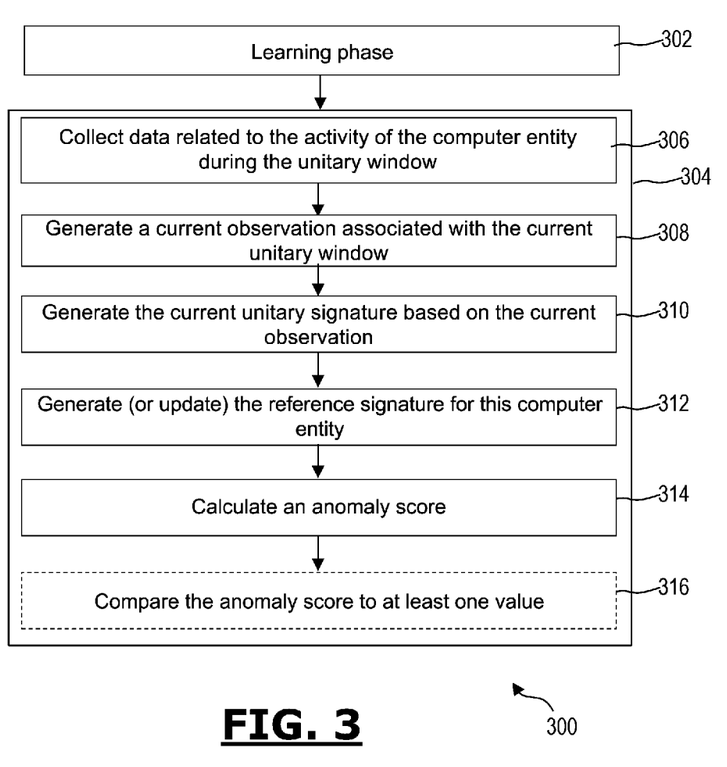
FIG. 3 is a schematic representation of a non-limiting exemplary embodiment of a method according to the invention.

FIG. 3 is a schematic representation of a non-limiting exemplary embodiment of a method for detecting anomalies within an IS according to one or more embodiments of the invention.

The method 300 shown in FIG. 3 comprises a deep learning phase 302 of the Siamese neural networks using a learning base comprising on the one hand observations for training Siamese neural networks and on the other hand observations for validating the learning. The training phase may be carried out using either of the training examples described with reference to FIGS. 2a and 2b.

The method 300 further comprises an anomalies detection phase 304 carried out by means of one of the Siamese neural networks having been trained during the learning phase 302. In other words, after training of the Siamese neural networks, only one of these networks is used during the detection phase 304.

The detection phase 304 may be implemented for at least one entity, for several entities, and in particular for each of the entities, of the IS individually, one by one or in parallel.

The detection phase 304 is reiterated as many times as desired, for example for each unitary window. The unitary window may be of a duration of one day, 3 days, etc.

In the described example, the detection phase 304 is considered to be repeated for each unitary window, and each unitary window has a duration of 1 day. Furthermore, in the following, the example will be described with reference to the same unique entity, knowing that the detection phase may be implemented for more than one entity, taken individually, in parallel or one by one.

During a step 306 of the detection phase, data related to the activity of the computer entity during the current unitary window are collected. These data are optionally filtered and aggregated in order to furnish a vector of dimension "N," with "N" being the number of monitored operating parameters, and N≥1.

During a step 308 of the detection phase 304, an observation, called current, comprising the data collected on an observation window, called current, is generated. The current observation window comprises the current unitary window and is terminated by said current window. The current observation window may correspond to the current unitary window. In this case, the current observation corresponds to the vector of dimension N generated during step 306. Alternatively, the current observation window may comprise the current unitary window and "M" unitary window(s) immediately preceding the current unitary window in time, with M≥1. In this case the current observation corresponds to a matrix formed by the M+1 vectors of dimension N obtained for the unitary windows forming the observation window. For example, if the current observation window comprises three unitary windows, as in the example in FIG. 1, then the current observation corresponds to a matrix formed by these three vectors of dimension N.

During a step 310 of the detection phase, a unitary signature corresponding to the current unitary window is generated by the signature generator, taking the current observation as input.

During a step 312, a reference signature, called current, is generated, or updated, for this computer entity and for this current unitary window, this reference signature representing the behavior of said computer entity during a reference period, denoted P. According to a non-limiting exemplary embodiment, the reference period P is a sliding window comprising several, in particular M, unitary windows immediately preceding the current unitary window, with M≥2. In this case, the current reference signature, denoted $R_0$, corresponds to the average of the unitary signatures obtained for these M unitary windows. In the example shown in FIG. 1, M=10. Consequently, for the current unitary window $J_0$, denoting $R_0$ as the current reference signature and $S_0$ the current unitary signature, we have:

$$R_0 = \text{avg}(S_{-1} - S_{-M})$$

During a step 314, an anomaly score, denoted $Z_0$, is calculated for the computer entity and for the current window. The objective of the anomaly score is to quantify the difference between the behavior of the computer entity during the unitary window, and the behavior of that same computer entity during the reference period P.

The anomaly score $Z_0$ may be calculated in different ways. For example, the anomaly score may correspond to the distance between the current unitary signature $S_0$ and the current reference signature $R_0$, $Z_0$=distance($S_0,R_0$). The anomaly score $Z_0$ may be calculated using another relationship, predetermined, such as the one described hereinafter with reference to FIG. 5.

Furthermore, the method 300 may comprise an optional step 316 of comparing the current anomaly score $Z_0$ to at least one predetermined value, such as a threshold value representing an abnormal behavior.

This threshold value may be determined by tests.

This threshold value may also be determined based on anomaly scores obtained during previous iterations of the detection phase 304. For example, the threshold value may correspond to the maximum value of variation of the anomaly scores determined over the reference period.

Figure 4:
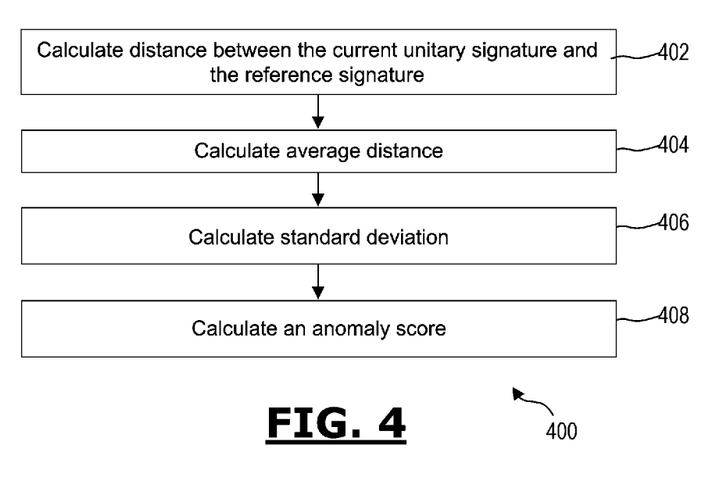
FIG. 4 is a schematic representation of a non-limiting example of calculating an anomaly score that may be used in one or more embodiments of the invention.

FIG. 4 is a schematic representation of a non-limiting exemplary embodiment of an anomaly score calculation that can be implemented in one or more embodiments of the invention.

The example 400 shown in FIG. 4 may be step 314 of the method 300 of FIG. 3.

In example 400, a step 402 determines the distance $d_0$ between the current signature and the reference signature $R_0$.

Then, a step 404 determines, or updates, a value, denoted MEAN, corresponding to the average distance between the reference signature $R_0$ and each of the signatures $S_{-1}$ to $S_{-M}$. In other words, this step 404 calculates the MEAN value with the following relationship:

$$\text{MEAN} = \text{average}(d_{-1}, \ldots, d_{-M})$$

where $d_i = \text{distance}(S_i, R_0)$, where $-1 \leq i \leq -M$

A step 406 calculates the standard deviation, denoted STD, of the distances between the reference signature and each unitary signature associated with each unitary window of said reference period. In other words, this step 406 calculates the STD value with the following relationship:

$$\text{STD} = \text{Standard deviation}(d_{-1}, \ldots, d_{-M})$$

where $d_i = \text{distance}(S_i, R_0)$, where $-1 \leq i \leq -M$

Finally, the step 408 determines the anomaly score $Z_0$ using the following relationship:

$$Z_0 = (d_0 - \text{MEAN})/\text{STD}$$

Of course, this exemplary embodiment is in no way limiting and any other relationship may be used.

Figure 5:
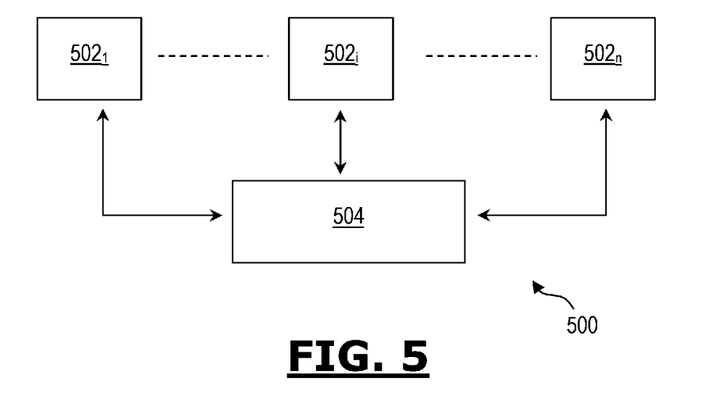
FIG. 5 is a schematic representation of a non-limiting exemplary embodiment of an IS according to one or more embodiments of the invention.

FIG. 5 is a schematic representation of a non-limiting exemplary embodiment of an IS according to one or more embodiments of the invention.

The information system 500 of FIG. 5 comprises one or more computer entities $502_1$-$502_n$ and an anomalies detection system 504 intended to implement the method according to one or more embodiments of the invention, and in particular the method 300 of FIG. 3

Each computer entity $502_i$ may be a physical machine, a virtual machine, a physical user account, a functional user account, a server, etc. At least two computer entities $502_1$-$502_n$ might not be connected to each other. At least two computer entities $502_1$-$502_n$ may be connected to each other through a wired or wireless network, a local network, an Internet type network, etc.

The system 504 may comprise one or more computer devices.

In particular, the system 504 may be a server, wired or wirelessly connected to each of the computer entities $502_1$-$502_n$ directly or through a communications network, local or otherwise.

The system 504 may comprise:
- a module for collecting and aggregating data during a unitary window,
- a generator of unitary digital signatures based on a Siamese neural network architecture,
- a module for calculating a reference signature; and
- at least one anomaly score calculating module.

Each of these modules (not shown in FIG. 5) may be a software module or a hardware module or a combination of at least one software module and at least one hardware module such as a processor, an electronic chip, etc.

At least one of these modules may be an individual module.

At least two of these modules may be integrated within a unitary module, software and/or hardware.

Of course, the one or more embodiments of the invention are not limited to the examples detailed herein before given for purposes of illustration and the general scope of the invention is defined in the claims.

The invention claimed is:

1. A computer implemented method for detecting anomalies in an information system (IS), comprising several computer entities, said computer implemented method comprising:

at least one iteration of a detection phase for at least one entity of said several computer entities of said IS and at least one time window,
  wherein said at least one time window comprises a current unitary window,
wherein said detection phase comprises
  collecting data related to an activity of said at least one entity during said current unitary window;
  constructing a data set associated with said current unitary window based on the data collected during a window comprising said current unitary window,
  wherein said data set comprises an observation and said window is an observation window,
  generating a unitary digital signature representative of a behavior of said at least one entity during said current unitary window based on said observation; and,
  calculating an anomaly score, associated with said at least one entity for said current unitary window based on
  said unitary digital signature, and
  a reference digital signature, wherein said reference digital signature is previously calculated for said at least one entity and is representative of the activity of said at least one entity over a period preceding said current unitary window,
  wherein said period is a reference period,
wherein said unitary digital signature and said reference digital signature are generated using a generator based on deep learning Siamese neural networks and
wherein, for the unitary digital signature, the anomaly score is calculated using $$Z_0 = (d_0 - \text{MEAN})/\text{STD}$$

where
  $d_0$ is a distance between the reference digital signature and the unitary digital signature;
  MEAN is an average of distances between the reference digital signature and each unitary digital signature associated with said each unitary window of said reference period, and
  STD is a standard deviation of the distances between the reference digital signature and said each unitary digital signature associated with said each unitary window of said reference period.

2. The computer implemented method according to claim 1, wherein the reference period comprises several unitary windows preceding the current unitary window, and wherein said method further comprises generating the reference digital signature comprising for said each unitary window of said several unitary windows of the reference period, generating, by the generator, a unitary digital signature based on the observation associated with said each unitary window, and calculating said reference digital signature based on said unitary digital signature that is generated for each unitary window, by averaging all of said unitary digital signature from said each unitary window of said several unitary windows.

3. The computer implemented method according to claim 1, wherein the detection phase further comprises updating the reference digital signature with the unitary digital signature associated with the current unitary window for a new iteration of said detection phase for a subsequent unitary window.

4. The computer implemented method according to claim 1, wherein the observation window is equal to the current unitary window, and wherein the observation associated with the current unitary window is constructed based on said data collected only during the current unitary window.

5. The computer implemented method according to claim 1, wherein the observation window is a sliding time window comprising the current unitary window and at least one unitary window preceding in time said current unitary window, wherein the observation associated with the current unitary window is constructed based on said data collected during said current unitary window and said at least one unitary window.

6. The computer implemented method according to claim 1, wherein said collecting data comprises a collection of one or more values for one or more predefined parameters.

7. The computer implemented method according to claim 6, further comprising aggregating, for at least one parameter of said one or more predefined parameters, several values of said one or more values collected during the current unitary window.

8. The computer implemented method according to claim 1, further comprising a learning phase of the deep learning Siamese neural networks with a base of learning observations, prior to the detection phase.

9. The computer implemented method according to claim 8, wherein the deep learning Siamese neural networks are trained using a Contrastive Loss optimization function.

10. The computer implemented method according to claim 8, wherein the deep learning Siamese neural networks are trained using a Triplet Loss optimization function.

11. A computer program comprising instructions executable by a computer device which, when executed, implement a computer implemented method for detecting anomalies in an information system (IS), comprising several computer entities, said computer implemented method comprising:
at least one iteration of a detection phase for at least one entity of said several computer entities of said IS and at least one time window,
wherein said at least one time window comprises a current unitary window,
wherein said detection phase comprises
collecting data related to an activity of said at least one entity during said current unitary window;
constructing a data set associated with said current unitary window based on the data collected during a window comprising said current unitary window, wherein said data set comprises an observation and said window is an observation window,
generating a unitary digital signature representative of a behavior of said at least one entity during said current unitary window based on said observation; and,
calculating an anomaly score, associated with said at least one entity for said current unitary window based on
said unitary digital signature, and
a reference digital signature, wherein said reference digital signature is previously calculated for said at least one entity and is representative of the activity of said at least one entity over a period preceding said current unitary window,
wherein said period is a reference period,
wherein said unitary digital signature and said reference digital signature are generated using a generator based on deep learning Siamese neural networks and
wherein, for the unitary digital signature, the anomaly score is calculated using $$Z_0 = (d_0 - \text{MEAN})/\text{STD}$$

where
$d_0$ is a distance between the reference digital signature and the unitary digital signature;
MEAN is an average of distances between the reference digital signature and each unitary digital signature associated with said each unitary window of said reference period, and
STD is a standard deviation of the distances between the reference digital signature and said each unitary digital signature associated with said each unitary window of said reference period.

12. An anomaly detection system in an information system (IS), then anomaly detection system comprising:
means configured for implementing a method for detecting said anomalies in said information system (IS), said method comprising
at least one iteration of a detection phase for at least one entity of said information system (IS) and for at least one time window,
wherein said at least one time window comprises a current unitary window,
wherein said detection phase comprises
collecting data related to an activity of said at least one entity during said current unitary window;
constructing a data set associated with said current unitary window based on said data collected during a window comprising said current unitary window,
wherein said data set comprises an observation and said window is an observation window,
generating a unitary digital signature representative of a behavior of said at least one entity during said current unitary window based on said observation; and,
calculating an anomaly score, associated with said at least one entity for said current unitary window based on
said unitary digital signature, and
a reference digital signature, wherein said reference digital signature is previously calculated for said at least one entity and is representative of the activity of said at least one entity over a period preceding said current unitary window,
wherein said period is a reference period,
wherein said unitary digital signature and said reference digital signature are generated using a generator based on deep learning Siamese neural networks and
wherein, for the unitary digital signature, the anomaly score is calculated using $$Z_0 = (d_0 - \text{MEAN})/\text{STD}$$

where
$d_0$ is a distance between the reference digital signature and the unitary digital signature;

MEAN is an average of distances between the reference digital signature and each unitary digital signature associated with said each unitary window of said reference period, and STD is a standard deviation of the distances between the reference digital signature and said each unitary digital signature associated with said each unitary window of said reference period.

13. The anomaly detection system according to claim 12, wherein said at least one entity comprises several computer entities.

14. The anomaly detection system according to claim 13, wherein at least one computer entity of the several computer entities is a physical machine, or a virtual machine, or a physical user account, or a functional user account.

\* \* \* \* \*